May 5, 1959 H. C. PAULSEN 2,884,922
APPARATUS FOR HANDLING THERMOPLASTIC CEMENT IN ROD FORM
Filed Aug. 15, 1955 2 Sheets-Sheet 1
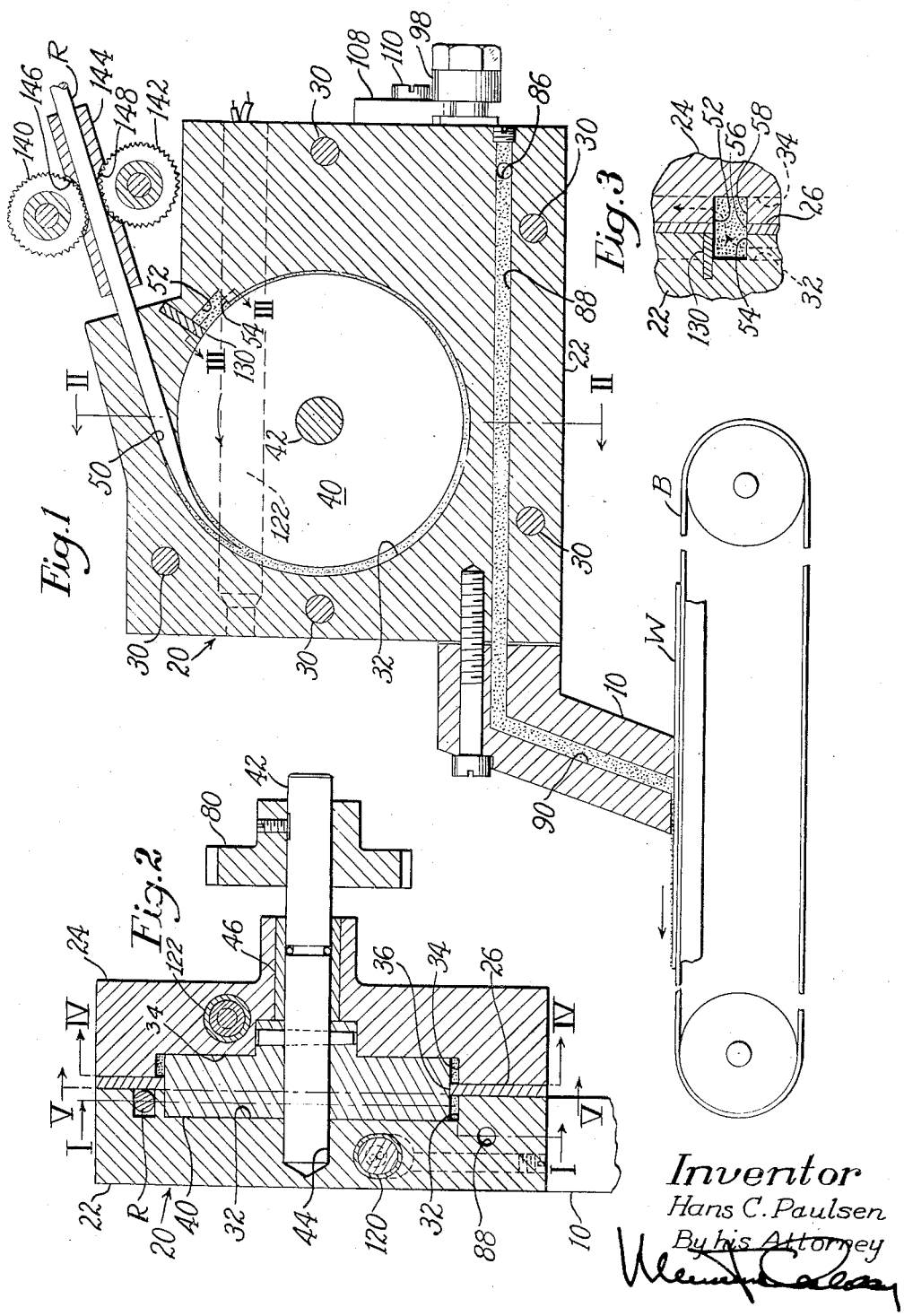
Inventor
Hans C. Paulsen
By his Attorney May 5, 1959  H. C. PAULSEN  2,884,922
APPARATUS FOR HANDLING THERMOPLASTIC CEMENT IN ROD FORM
Filed Aug. 15, 1955  2 Sheets-Sheet 2
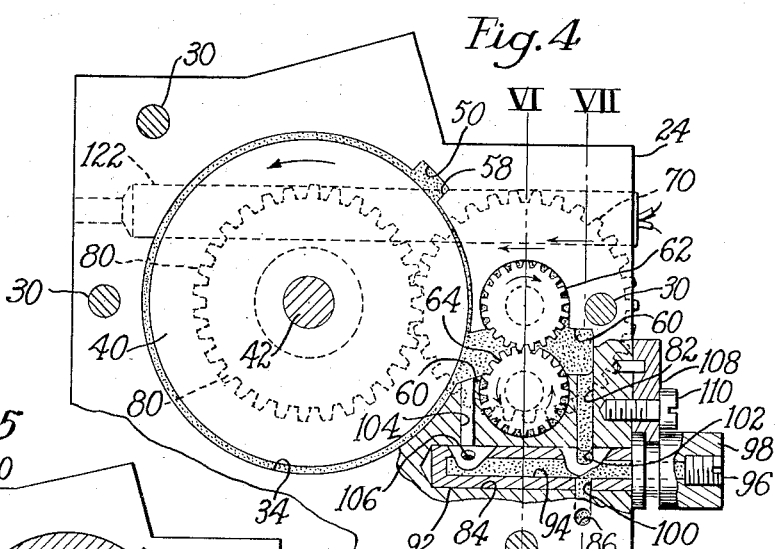
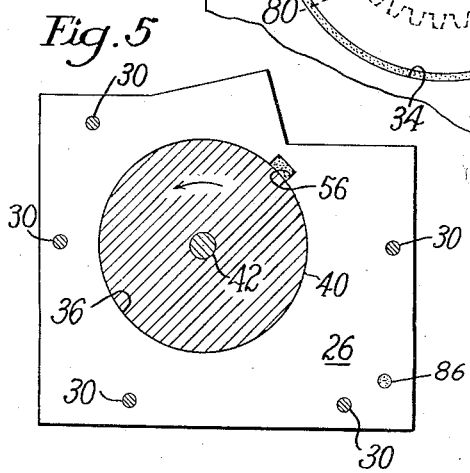
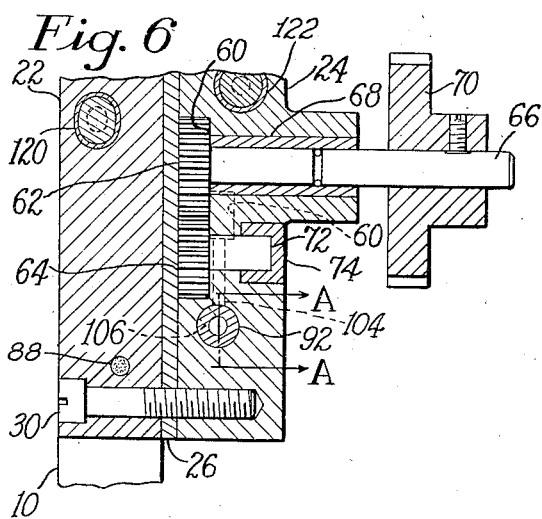
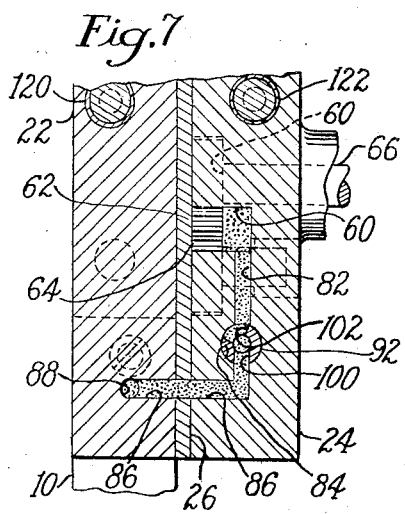
Inventor
Hans C. Paulsen
By his Attorney

United States Patent Office 2,884,922
Patented May 5, 1959

2,884,922

APPARATUS FOR HANDLING THERMOPLASTIC CEMENT IN ROD FORM

Hans C. Paulsen, Medford, Mass., assignor to United Shoe Machinery Corporation, Flemington, N.J., a corporation of New Jersey Application August 15, 1955, Serial No. 528,499

11 Claims. (Cl. 126—343.5)

This invention relates to cement handling apparatus and particularly to a novel and improved apparatus for heating and melting thermoplastic cement supplied in strip or rod form as disclosed, for example, in United States Letters Patent No. 2,765,768, granted October 9, 1956 in my name.

The aforementioned patent discloses an apparatus for handling so-called rod cement, i. e., thermoplastic adhesive material in the form of an elongated strip or rod, which includes a hollow heated casing in which there is journaled a rotatable disk, this casing being so formed as to provide, together with the disk, a passage extending from an inlet in the casing along a major portion of the periphery of the disk to an outlet in the casing. With this prior arrangement, as the disk is rotated it carries the rod of adhesive along the mentioned passage from the inlet to the outlet and causes the adhesive to become heated and rendered molten before it reaches the outlet as the result of heat supplied thereto from the heated casing and from the periphery of the disk which, of course, is heated by contact with the casing. Preferably, and as illustrated in the mentioned patent, a positively acting gear pump is provided for removing the molten adhesive from the outlet and for delivering it to a point of use as, for example, by extruding the molten adhesive through a nozzle member, while mechanism including a slip drive is provided for feeding the leading end of a rod of adhesive into the inlet of the casing.

It is an object of this invention to provide a novel and improved apparatus for handling rod cement of the same general type as that disclosed in the prior patent but which is considerably more effective and efficient than the earlier arrangement. To that end, in the herein illustrated apparatus which includes a heated hollow casing having an inlet and an outlet with a rotatable member journaled therein, the casing is so formed as to provide, together with the rotatable member, a continuous passage which extends along the periphery of the rotary member for a distance which is considerably in excess of the circumference of said rotary member and which, in fact, is nearly equal to twice the circumference of said member, with the inlet of the casing connected to one end of the passageway and the outlet connected to the other end thereof. The casing is, in accordance with a feature of the invention, so formed as to provide, together with the rotatable member which is journaled therein, two interconnected circular passages extending in spaced side-by-side relation along the periphery of the rotatable member and with the inlet of the casing connected to one of these circular passages and the outlet connected to the other, the passage to which the inlet is connected preferably being of gradually tapering radial thickness as it progresses from the point of connection to the inlet to the point of interconnection with the other passage while the other passage preferably is of substantially uniform radial thickness as it progresses from the point of interconnection to the point of connection with the outlet.

More particularly and as herein illustrated, the casing comprises a pair of end members each provided with a centrally located recess and an intermediate member having a centrally located aperture, with a rotatable disk journaled in the casing which extends through the mentioned aperture and into the recesses in the end members. The mentioned recesses are so shaped as to provide, together with the peripheral surface of the disk, two circular passages and the casing is provided with an inlet which is connected to one of these circular passages, an outlet connected to the other passage and an axially extending cross passage which interconnects the two mentioned circular pasages. It will be readily appreciated that the novel arrangement provided by this invention makes it possible substantially to double the length of the passage in the heated casing from the inlet to the outlet. Thus, the effectiveness of the apparatus to heat and to melt the adhesive as it is fed through this heated passage by means of the rotatable disk is substantially doubled and the efficiency of the apparatus correspondingly increased.

The above and other objects and features of the invention will appear in the following detailed description of the embodiment thereof which is illustrated in the accompanying drawings, and will be pointed out in the claims.

In the drawings,

Fig. 1 is a view in side elevation, with certain parts in vertical section substantially on line I—I of Fig. 2 and looking in the direction of the arrows, of a cement handling apparatus, embodying the features of this invention;

Fig. 2 is a view in vertical section of the apparatus shown in Fig. 1 substantially on line II—II and looking in the direction of the arrows;

Fig. 3 is a view in section of a portion of the apparatus shown in Fig. 1, the section being taken substantially on line III—III and looking in the direction of the arrows;

Fig. 4 is a view in vertical section of the cement handling apparatus taken on line IV—IV of Fig. 2 and with certain parts shown in section on line A—A in Fig. 6;

Fig. 5 is a view in section of the cement handling apparatus taken substantially on line V—V of Fig. 2 and looking in the direction of the arrows; and Figs. 6 and 7 are sectional views of the cement handling apparatus taken respectively on lines VI—VI and VII—VII of Fig. 4 and looking in the direction of the arrows.

Referring to these drawings, in Fig. 1 the improved cement handling apparatus is illustrated, by way of an example, as provided with a nozzle member 10 through which molten adhesive may be applied to a work piece W presented thereto by means of a conveyor belt B. The cement handling mechanism includes a casing, indicated generally by the reference character 20, which comprises two end members 22, 24 and an intermediate member 26, these members being held together in side-to-side relation by means of suitable screws 30, 30, Figs. 1, 4 and 5. The end member 22 is provided with a centrally located recess 32, the end member 24 is provided with a centrally located recess 34 while the intermediate member 26 has a centrally disposed aperture 36. Journaled in the casing is a disk 40 which is pinned to a shaft 42, this shaft having an end which is rotatable in a bore 44 formed in the end member 22 and a portion which extends outwardly through a bearing bushing 46, pressed into the end member 24, Fig. 2. The disk 40 is of a size to rotate freely in the aperture 36 but is appreciably smaller than either of the recesses 32 and 34, see Fig. 1 and Fig. 4.

As is shown in Fig. 1, the recess 32 is of generally spiral shape so that it forms, with the periphery of the disk 40, a circular space or passage which is of gradually tapering radial thickness from its point of connection to a tangential passage 50, formed in the member 22 and providing an inlet in the casing 22, around the periphery of the disk to an axially extending cross passage 52, formed partly in each of the three members 22, 24 and 26 by means of notches 54, 56 and 58 which are cut therein, Fig. 3. The recess 34 is of circular shape, Fig. 4, so that it provides, together with the periphery of the disk 40, a circular passage of uniform radial thickness extending from the cross passage 50 around the periphery of the disk to an outlet in the casing which is provided by a recess 60 formed in the end member 24. This recess is shaped to receive the two intermeshing gears 62, 64 of a gear pump, the gear 62 being formed integrally with a shaft 66 which extends outwardly through a bearing bushing 68, pressed into the end member 24, and carrying a pinion 70; while the gear 64 is formed integrally with a shaft 72 which is journaled in a bushing 74, Fig. 6. The pinion 70 is in mesh with a gear 80 which is fast on the shaft 42 and this gear is adapted to be driven from a power source, not shown, for the purpose of rotating the disk 40 and the gears 62, 64 of the gear pump.

The end member 24 is formed with a vertical passage 82 which extends downwardly across a bore 84 to a cross passage 86, formed partly in the member 24 and partly in the member 26, Fig. 7. This cross passage opens into a longitudinally extending passage 88 which is in communication with a delivery passage 90 formed in the nozzle 10, Fig. 1. Rotatably mounted in the bore 84 is a bypass valve 92 having a bore 94, which is closed by a plug 96, and a head 98. In the same location as the passage 82, this bypass valve is provided with two diametrically opposed openings, or ports 100, 102, the former being substantially of the same size as the passage 82 while the latter is considerably wider than the passage, Fig. 7. Extending between the bore 84 and the outlet 60, in a location between the recess 34 and the gears 62, 64, Fig. 4, is a passage 104, this passage being formed in the end member 24, and the bypass valve 92 is provided with a port 106 which by turning the bypass valve may be made to overlap the passage 104 more or less. Thus, it will be readily understood that by suitable manipulation of the bypass valve 98, which is held in place against axial movement in the bore 84 by means of a keeper block 108 and screw 110, the operator may selectively bypass, or return, a desired portion of the output of the gear pump 62, 64 back to the outlet 60.

The end members 22 and 24 are each provided with a bore for receiving an electrical heating unit, these units being indicated, respectively, by the reference characters 120, 122 and being connected to a suitable source of electrical energy, not shown. Referring to Fig. 1, it will be observed that the recess 32 between the notch 54 and the inlet 50 is of circular shape and nicely fits the periphery of the disk 40. Further to insure that molten cement will not be carried along by the disk 40 from the notch 54 to the inlet 50, a scraper blade 130 is provided and this blade is located, as shown in Figs. 1 and 3, in a slot of suitable shape which is cut into the member 22.

For feeding the leading end of a rod of cement R into the inlet 50, a feeding mechanism similar to that disclosed in the aforementioned application may be provided. As diagrammatically illustrated in Fig. 1, this feeding mechanism includes a pair of feed wheels 140, 142 and a guide bushing 144, this bushing being cut away at 146 and 148 to permit portions of these feed wheels to engage the rod R. Preferably, these feed wheels will be driven by mechanism, not shown, including a friction clutch so that a slipping drive is provided which causes the feed wheels to feed the rod R into the inlet 50 at a rate corresponding to the rate at which molten cement is being taken away from the device through the passages 82, 86, 88 and nozzle 10.

In use, the leading end of a rod of cement R is fed into the inlet 50 by means of the feed wheels 140, 142 and this rod of solid cement is heated and rendered molten as it is drawn along by the action of the rotary disk through the passageway formed by the recess 32 and the periphery of the disk from the inlet 50 to the cross passage 52. Preferably, the casing 20 and the disk 40 are heated by the elements 120, 122, which may be controlled by suitable thermostats not shown, to temperatures sufficient to assure that the cement is rendered molten and flowable by the time it reaches the cross passage 52. This molten adhesive flows through the cross passage 52 and is then drawn along by the action of the disk through the circular passage which is formed by the recess 34 and the periphery of the disk from the cross passage 52 to the outlet 60. As this molten adhesive is thus drawn along through the second passage, it absorbs additional heat from the casing and also from the periphery of the disk. Thus, this novel apparatus is much more effective and efficient in melting and heating the rod cement than was the prior arrangement in which the path of travel of the adhesive was limited to a distance less than the circumference of the disk. Accordingly, with a disk of reasonable size is becomes possible either to increase the over-all rate of progress of adhesive through the apparatus while still reducing it to the desired molten state to be handled by the gear pump, or otherwise extruded onto a workpiece, or while maintaining a desired rate of delivery of molten adhesive at the nozzle, the temperature of the molten adhesive thus delivered may be considerably increased as a result of the longer path of travel through the apparatus and the corresponding longer time during which the adhesive is kept in contact with the heated casing and with the periphery of the heated disk.

Having thus described my invention, what I claim as new and desire to secure by Letters Patent of the United States is:

1. Apparatus for handling cement in rod form comprising a hollow casing having an inlet and an outlet, means for heating the casing, a rotatable member journaled in said casing, said casing being formed to provide with said rotatable member two circular passages extending in spaced side-by-side parallel relation along the periphery of said rotatable member and an axially extending cross passage formed in the casing interconnecting said circular passages and with said inlet connected to one of said circular passages and extending substantially tangential thereto and said outlet connected to the other of said passages, means associated with the cross passage and cooperating with the periphery of the rotatable member adjacent to the end of said first-named circular passage for deflecting molten cement from said first-mentioned circular passage, through the cross passage and into said second-mentioned circular passage, means for feeding the leading end of a rod of cement into said inlet, and means for rotating said rotatable member to cause it to deliver melted cement to said outlet.

2. Apparatus for handling cement in rod form comprising a hollow casing having an inlet and an outlet, means for heating the casing, a rotatable member journaled in said casing, said casing being formed to provide with said rotatable member two circular passages extending in spaced side-by-side parallel relation along the periphery of said rotatable member and an axially extending cross passage formed in the casing interconnecting said circular passages and with said inlet connected to one of said circular passages and extending substantially tangential thereto and said outlet connected to the other of said passages, the passage to which said inlet is connected being of gradually tapering radial thickness as it progresses from its point of connection to said inlet to the point of interconnection with said other passage, means associated with the cross passage and cooperating with the periphery of the rotatable member adjacent to the end of said first-named circular passage for deflecting molten cement from said first-mentioned circular passage, through the cross passage and into said second-mentioned circular passage, means for feeding the leading end of a rod of cement into said inlet, and means for rotating said rotatable member to cause it to deliver melted cement to said outlet.

3. Apparatus for handling cement in rod form comprising a hollow casing having an inlet and an outlet, means for heating the casing, a rotatable member journaled in said casing, said casing being formed to provide with said rotatable member two circular passages extending in spaced side-by-side parallel relation along the periphery of said rotatable member and an axially extending cross passage formed in the casing interconnecting said circular passages and with said inlet connected to one of said passages and extending substantially tangential thereto and said outlet connected to the other of said passages, the passage to which said inlet is connected being of gradually tapering radial thickness as it progresses from its point of connection to said inlet to the point of interconnection with said other passage and said other passage being of substantially uniform radial thickness as it progresses from the point of interconnection to its point of connection with said outlet, means associated with said cross passage and cooperating with the periphery of the rotatable member adjacent to the end of said first-named circular passage for deflecting melted cement from said first-mentioned circular passage through the cross passage and into said second-mentioned circular passage, means for feeding the leading end of a rod of cement into said inlet, and means for rotating said rotatable member to cause it to deliver melted cement to said outlet.

4. Apparatus for handling cement in rod form comprising a hollow casing having an inlet and an outlet, means for heating the casing, a rotatable member journaled in said casing, said casing being formed to provide with the rotatable member two circular passages extending in spaced side-by-side relation circumferentially along the periphery of the rotatable member and an axially extending cross passage interconnecting said circular passages and with said inlet connected to one of the circular passages and the outlet connected to the other said circular passage, a scraper blade located in said cross passage and adapted to cooperate with the periphery of said rotatable member adjacent to the end of said first-named circular passage, means for feeding the leading end of a rod of cement into said inlet, and means for rotating said rotatable member to cause it to deliver melted cement to said outlet.

5. Apparatus for handling cement in rod form comprising a hollow casing having an inlet and an outlet, means for heating the casing, a rotatable disk journaled in said casing, said casing being formed to provide with the rotary disk two circular passages extending in spaced side-by-side relation circumferentially along the periphery of the rotatable disk and an axially extending cross passage interconnecting said circular passages and with said inlet connected to one of the circular passages and the outlet connected to the other of said circular passages, a scraper blade located in said cross passage and adapted to cooperate with the periphery of said rotatable disk adjacent to the end of said first named circular passage, means for feeding the leading end of a rod of cement into said inlet, and means for rotating said rotatable disk to cause it to deliver melted cement to said outlet.

6. Apparatus for handling cement in rod form comprising a hollow casing having an inlet and an outlet, means for heating the casing, a rotatable member journaled in said casing, said casing being formed to provide with the rotatable member two circular passages extending in spaced side-by-side relation circumferentially along the periphery of the rotatable member and an axially extending cross passage interconnecting said circular passages and with said inlet connected to one of the circular passages and the outlet connected to the other of said circular passages, the passage to which said inlet is connected being of gradually tapering radial thickness as it progresses from its point of connection to said inlet to said cross passage, a scraper blade located in said cross passage and adapted to cooperate with the periphery of said rotatable member adjacent to the end of said first-named circular passage, means for feeding the leading end of a rod of cement into said inlet, and means for rotating said rotatable member to cause it to deliver melted cement to said outlet.

7. Apparatus for handling cement in rod form comprising a hollow casing having an inlet and an outlet, means for heating the casing, a rotatable disk journaled in said casing, said casing being formed to provide with the rotatable disk two circular passages extending in spaced side-by-side relation circumferentially along the periphery of the rotatable disk and an axially extending cross passage interconnecting said circular passages and with said inlet connected to one of the circular passages and the outlet connected to the other of said circular passages, the passage to which said inlet is connected being of gradually tapering radial thickness as it progresses from its point of connection to said inlet to said cross passage, a scraper blade located in said cross passage and adapted to cooperate with periphery of said rotatable disk adjacent to the end of said first-named circular passage, means for feeding the leading end of a rod of cement into said inlet, and means for rotating said rotatable disk to cause it to deliver melted cement to said outlet.

8. Apparatus for handling cement in rod form having a hollow casing comprising a pair of end members each provided with a centrally disposed recess and an intermediate member having a centrally located circular aperture, means for heating the casing, a rotatable member journaled in said casing with its peripheral surface extending through the aperture in the intermediate member and into the recesses in said end members, said recesses being so shaped as to provide with the peripheral surface of the rotatable member two circular passages extending in spaced side-by-side relation along the peripheral surface of the rotatable member, said casing being provided with an inlet connected to one of the passages, an outlet connected to the other of said passages, and an axially extending cross passage interconnecting said circular passages, means for feeding the leading end of a rod of cement into said inlet, and means for rotating said rotatable member to cause it to deliver melted cement to said outlet.

9. Apparatus for handling cement in rod form having a hollow casing comprising a pair of end members each provided with a centrally disposed recess and an intermediate member having a centrally located circular aperture, means for heating the casing, a rotatable disk journaled in said casing with its peripheral surface extending through the aperture in the intermediate member and into the recesses in said end members, said recesses being so shaped as to provide with the peripheral surface of the rotatable disk two circular passages extending in spaced side-by-side relation along the peripheral surface of the rotatable disk, said casing being provided with an inlet connected to one of the passages, an outlet connected to the other of said passages, and an axially extending cross passage interconnecting said circular passages, means for feeding the leading end of a rod of cement into said inlet, and means for rotating said rotatable disk to cause it to deliver melted cement to said outlet.

10. Apparatus for handling cement in rod form having a hollow casing comprising a pair of end members each provided with a centrally disposed recess and an intermediate member having a centrally located circular aperture, means for heating the casing, a rotatable member journaled in said casing with its peripheral surface extending through the aperture in the intermediate member and into the recess in said end members, said recess being so shaped as to provide with the peripheral surface of the rotatable member two circular passages extending in spaced side-by-side relation along the peripheral surface of the rotatable member, said casing being provided with an inlet connected to one of the passages, an outlet connected to the other of said passages, and an axially extending cross passage interconnecting said circular passages, the passage to which said inlet is connected being of gradually tapering radial thickness as it progresses from its point of connection to said inlet to the cross passage, means for feeding the leading end of a rod of cement into said inlet, and means for rotating said rotatable member to cause it to deliver melted cement to said outlet.

11. Apparatus for handling cement in rod form having a hollow casing comprising a pair of end members each provided with a centrally disposed recess and an intermediate member having a centrally located circular aperture, means for heating the casing, a rotatable disk journaled in said casing with its peripheral surface extending through the aperture in the intermediate member and into the recesses in said end members, said recesses being so shaped as to provide with the peripheral surface of the rotatable disk two circular passages extending in spaced side-by-side relation along the peripheral surface of the rotatable disk, said casing being provided with an inlet connected to one of the passages, an outlet connected to the other of said passages, and an axially extending cross passage interconnecting said circular passages, the passage to which said inlet is connected being of gradually tapering radial thickness as it progresses from its point of connection to said inlet to said cross passage, means for feeding the leading end of a rod of cement into said inlet, and means for rotating said rotatable disk to cause it to deliver melted cement to said outlet.

References Cited in the file of this patent

UNITED STATES PATENTS

| | | |
|---|---|---|
| 2,130,689 | Leary | Sept. 20, 1938 |
| 2,341,392 | Shreckhise | Feb. 8, 1944 |
| 2,384,521 | Andersen et al. | Sept. 11, 1945 |
| 2,407,208 | Sherwood | Sept. 3, 1946 |
| 2,540,146 | Stober | Feb. 6, 1951 |
| 2,566,854 | Rhodes | Sept. 4, 1951 |
| 2,579,967 | Ruau | Dec. 25, 1951 |
| 2,589,323 | Ashley et al. | Mar. 18, 1952 |
| 2,604,659 | Eppler | July 29, 1952 |
| 2,700,260 | Paulsen | Jan. 25, 1955 |
| 2,725,033 | Pulford | Nov. 29, 1955 |
| 2,726,629 | Paulsen | Dec. 13, 1955 |
| 2,762,716 | Mackenzie | Sept. 11, 1956 |
| 2,783,735 | Paulsen | Mar. 5, 1957 |

FOREIGN PATENTS

| | | |
|---|---|---|
| 142,911 | Sweden | Nov. 10, 1953 |